(12) United States Patent
Hwang (10) Patent No.: US 9,758,201 B1
(45) Date of Patent: Sep. 12, 2017

(54) ACTIVE AERO FLAP APPARATUS FOR MUFFLER OF VEHICLE

(71) Applicant: Hyundai Motor Company, Seoul (KR)

(72) Inventor: Dae-Gil Hwang, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/355,382

(22) Filed: Nov. 18, 2016

(30) Foreign Application Priority Data

Jun. 3, 2016 (KR) ........................ 10-2016-0069411

(51) Int. Cl.
*B62D 35/02* (2006.01)

(52) U.S. Cl.
CPC ..................... *B62D 35/02* (2013.01)

(58) Field of Classification Search
CPC ...... B62D 35/02; B62D 35/00; B62D 35/007; B62D 35/008
USPC ............ 296/180.1, 180.5; 180/68.1; 123/676
See application file for complete search history.

(56) References Cited

U.S. PATENT DOCUMENTS

| 7,661,752 B2 * | 2/2010 | Yamazaki | B62D 25/20 296/180.1 |
| 9,188,052 B2 | 11/2015 | Tajima | |
| 2007/0182207 A1 * | 8/2007 | Nakaya | B62D 25/182 296/180.1 |
| 2015/0091325 A1 * | 4/2015 | Shiga | B62D 35/007 296/180.1 |

FOREIGN PATENT DOCUMENTS

| CN | 104203731 B | 3/2017 |
| JP | 4-143175 A | 5/1992 |
| JP | 7-215074 A | 8/1995 |
| JP | 2005-41387 A | 2/2005 |
| JP | 2006-282076 A | 10/2006 |
| KR | 10-2014-0049829 A | 4/2014 |

* cited by examiner

*Primary Examiner* — Stephen Gordon
(74) *Attorney, Agent, or Firm* — Morgan, Lewis & Bockius LLP (57) ABSTRACT

An active aero flap apparatus for a muffler of a may include an aero flap including a flap wing disposed at a side of the muffler, into which vehicle-induced wind is introduced, to block introduction of the vehicle-induced wind, and flap supporters formed to expand from both ends of the flap wing, drivelines rotatably coupling ends of the flap supporters to the muffler, and actuator modules rotating the aero flap about the drivelines.

9 Claims, 13 Drawing Sheets

ACTIVE AERO FLAP APPARATUS FOR MUFFLER OF VEHICLE

CROSS-REFERENCE TO RELATED APPLICATION

The present application claims priority to Korean Patent Application No. 10-2016-0069411, filed Jun. 3, 2016, the entire contents of which is incorporated herein for all purposes by this reference.

BACKGROUND OF THE INVENTION

Field of the Invention

The present invention relates to an active aero flap apparatus for a muffler mounted at an undercarriage of a vehicle, and more particularly to, an active aero flap apparatus having a variable structure, as an apparatus for improving aerodynamics of a vehicle through upgrade of a mounting structure of an undercarriage mounted at a lower part of a floor panel of the vehicle, in which the active aero flap apparatus is disposed at a side end of a main muffler to actively cover or uncover the side end of the main muffler. During a constant speed section having low temperature for prioritizing fuel efficiency, the active aero flap apparatus covers the side end of the main muffler, whereas during a high speed section having high temperature for preventing heat damage, the active aero flap apparatus uncovers the side end of the main muffler, and, as such, vehicle-induced wind passes through the side end of the main muffler.

Description of Related Art

Generally, an undercarriage is mounted at a lower part of a vehicle. The undercarriage functions to protect components mounted at the lower part of the vehicle, such as an engine and a transmission, and to prevent introduction of foreign substances into the vehicle through the lower part of the vehicle during driving. Furthermore, the undercarriage absorbs or blocks noise generated by the vehicle, particularly, noise from the engine and transmission. The undercarriage importantly functions to block transmission of noise from the vehicle. In addition, the undercarriage is mounted to improve aerodynamics of the components in the lower part of the vehicle, which is one of major factors in determining fuel efficiency of the vehicle.

However, in terms of a high temperature exhaust system (a muffler) mounted at the lower part of the vehicle, when the undercarriage covers the high temperature exhaust system, the exhaust system is not naturally cooled due to blocking vehicle-induced wind. Thus, heat damage may be generated, and, as such, the high temperature exhaust system should be exposed from the undercarriage.

Figure 1:
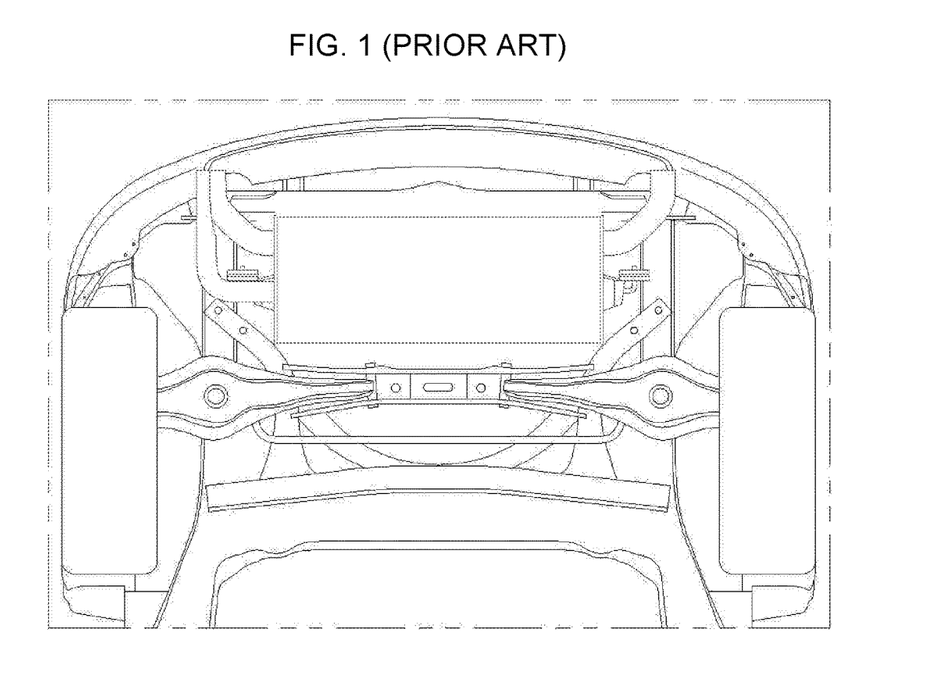
FIG. 1, FIG. 2, and FIG. 3 illustrate an exhaust system exposed from an undercarriage of a conventional vehicle.
Figure 2:
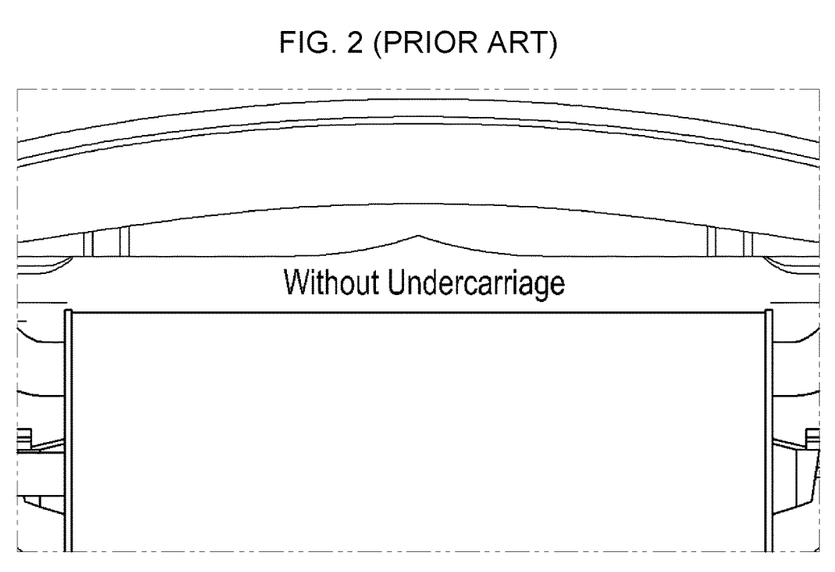
Figure 3:
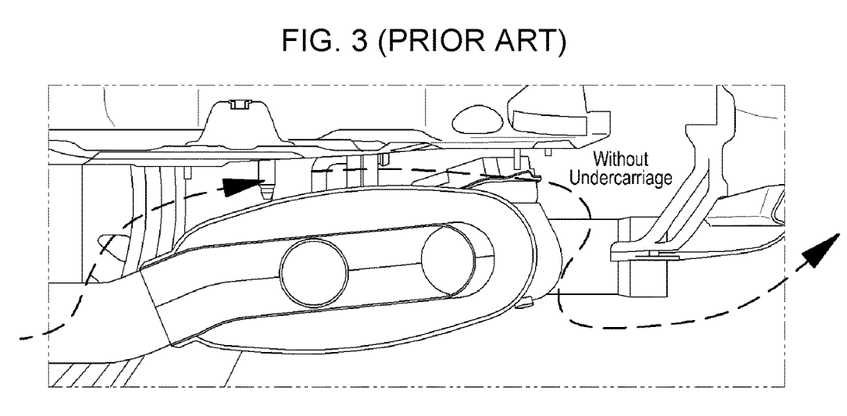

As illustrated in FIGS. 1 to 3, as a gap between a muffler and a rear bump at the conventional vehicle is spaced enough to induce vehicle-induced wind to pass through the gap during high speed driving, thereby preventing heat damage generated from the muffler.

However, a structure for prevention of heat damage according to the conventional vehicle has a problem in that aerodynamics loss is generated by introduction of vehicle-induced wind during a section for prioritizing fuel efficiency.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an active aero flap apparatus, as an apparatus for improving aerodynamics of a vehicle through upgrade of a mounting structure of an undercarriage mounted at a lower part of a floor panel of the vehicle. The active aero flap apparatus is disposed at a side end of a main muffler to actively cover or uncover the side end of the main muffler. During a constant speed section having low temperature for prioritizing fuel efficiency, the active aero flap apparatus covers the side end of the main muffler. During a high speed section having high temperature for preventing heat damage, the active aero flap apparatus uncovers the side end of the main muffler, and thus vehicle-induced wind passes through the side end of the main muffler. As a result, heat damage of an exhaust system disposed at the lower part of the vehicle is resolved and aerodynamics is improved through the active aero flap apparatus having such a variable structure.

According to various aspects of the present invention, an active aero flap apparatus for a muffler of a vehicle may include an aero flap comprising a flap wing disposed at a side of the muffler, into which vehicle-induced wind is introduced, to block introduction of the vehicle-induced wind, and flap supporters formed to expand from both ends of the flap wing, drivelines rotatably coupling ends of the flap supporters to the muffler, and actuator modules rotating the aero flap about the drivelines.

Each of the drivelines may include a shaft fixing each corresponding flap supporter to the muffler, a shaft head formed at an end of the shaft, and a bushing rotating the corresponding flap supporter coupled to the shaft.

Each of the drivelines may include a spring, a first end of which is fixed at the corresponding flap supporter and a second end of which is fixed at the corresponding driveline, and the spring may provide restoring force due to elastic force upon operation of the aero flap.

Each of the flap supporters of the aero flap may be bored to form a spring insertion hole, to which a first end of the spring is insertedly coupled, and each of the drivelines may include a stopper for fixing a second end of the spring.

The active aero flap apparatus may further include flap protrusions formed to protrude from ends of the flap supporters and to each have an assigned length, in which the flap protrusions may be pressed against by ends of actuators to rotate the aero flap upon operation of the actuator modules.

Each of the flap supporters may be bored to form a shaft insertion hole for coupling of the shaft at an end thereof.

The active aero flap apparatus may further include a controller controlling operation of the actuator modules, the controller may receive vehicle information to determine one of a section for preventing heat damage or a section for prioritizing fuel efficiency, in the section for preventing heat damage, the controller may control the actuator modules to rotate the flap wing and for vehicle-induced wind to be introduced to the muffler side, and in the section for prioritizing fuel efficiency, the controller may control the actuator modules to block introduction of the vehicle-induced wind to the muffler side.

The muffler may be formed to have curved actuator insertion grooves at sides thereof, into which the actuator modules may be inserted.

The active aero flap apparatus may further include fixing brackets fixing the actuator modules to the muffler.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

According to various embodiments of the present invention, an active aero flap apparatus is provided as an apparatus for improving aerodynamics of a vehicle through upgrade of a mounting structure of an undercarriage mounted at a lower part of a floor panel of the vehicle. The active aero flap apparatus is disposed at a side end of a main muffler to actively cover or uncover the side end of the main muffler. During a constant speed section having low temperature for prioritizing fuel efficiency, the active aero flap apparatus covers the side end of the main muffler. During a high speed section having high temperature for preventing heat damage, the active aero flap apparatus uncovers the side end of the main muffler, and thus vehicle-induced wind passes through the side end of the main muffler. As a result, heat damage of an exhaust system disposed at the lower part of the vehicle is resolved and aerodynamics is improved through the active aero flap apparatus having such a variable structure.

Figure 4:
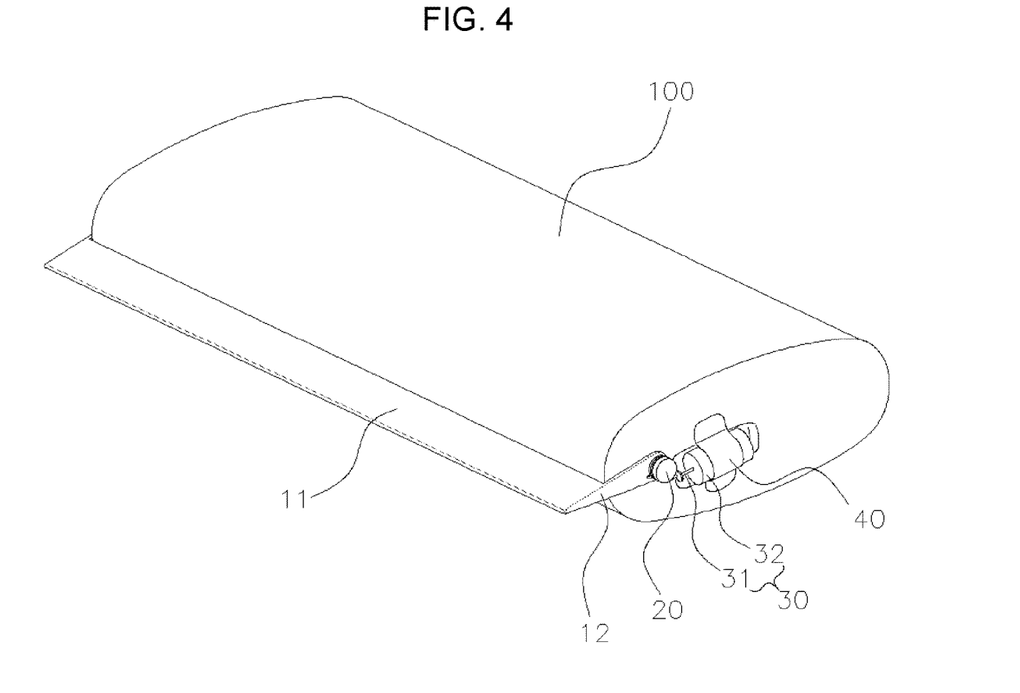
FIG. 4 is a perspective view illustrating an active aero flap apparatus for a muffler of a vehicle according to various embodiments of the present invention.
Figure 5:
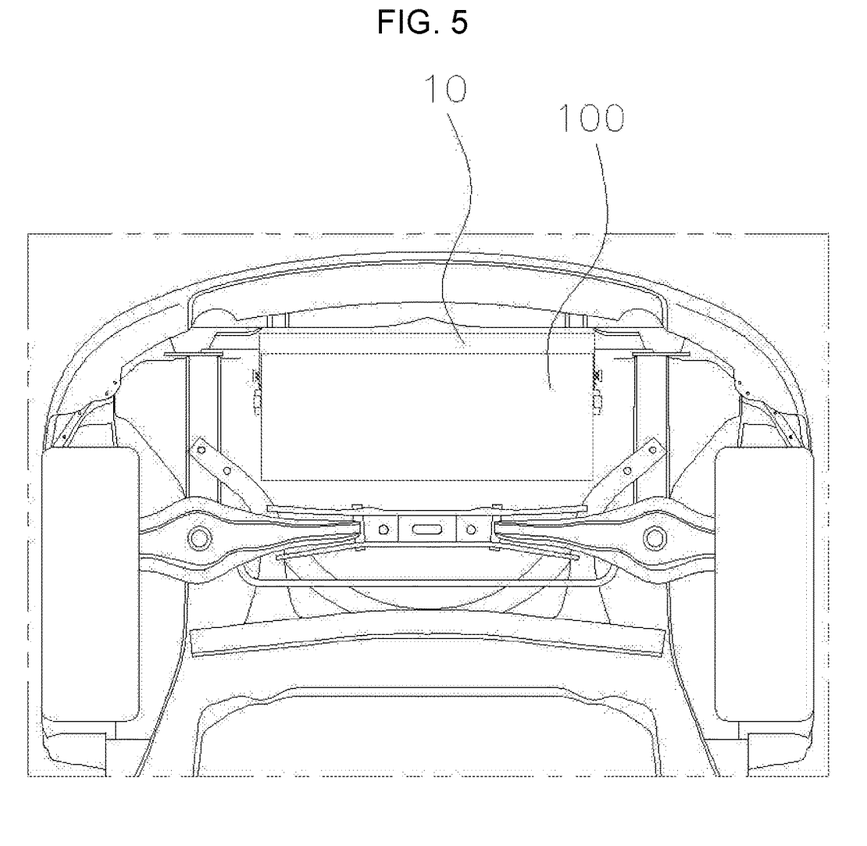
FIG. 5 is a bottom view illustrating a lower part of the vehicle mounted with the active aero flap apparatus for the muffler according to the various embodiments of the present invention.

FIG. 4 is a perspective view illustrating the active aero flap apparatus for the muffler of the vehicle according to various embodiments of the present invention. FIG. 5 is a bottom view illustrating a lower part of the vehicle to which the active aero flap apparatus for the muffler according to various embodiments of the present invention is mounted.

As illustrated, according to various embodiments of the invention, the active aero flap apparatus for the muffler in the vehicle is an additional apparatus disposed at a muffler 100 (the main muffler) mounted at a lower part of the vehicle. The active aero flap apparatus has a flap structure while being mounted at one side of the muffler 100.

The active aero flap apparatus includes an aero flap 10 for blocking passage of vehicle-induced wind, drivelines 20 for transferring power to the aero flap 10 while coupling the aero flap 10 to the muffler 100, actuator modules 30 for generating power which allows the aero flap 10 coupled by the drivelines 20 to be rotated, and fixing brackets 40 for fixing the actuator modules 30 to the muffler 100.

Figure 6:
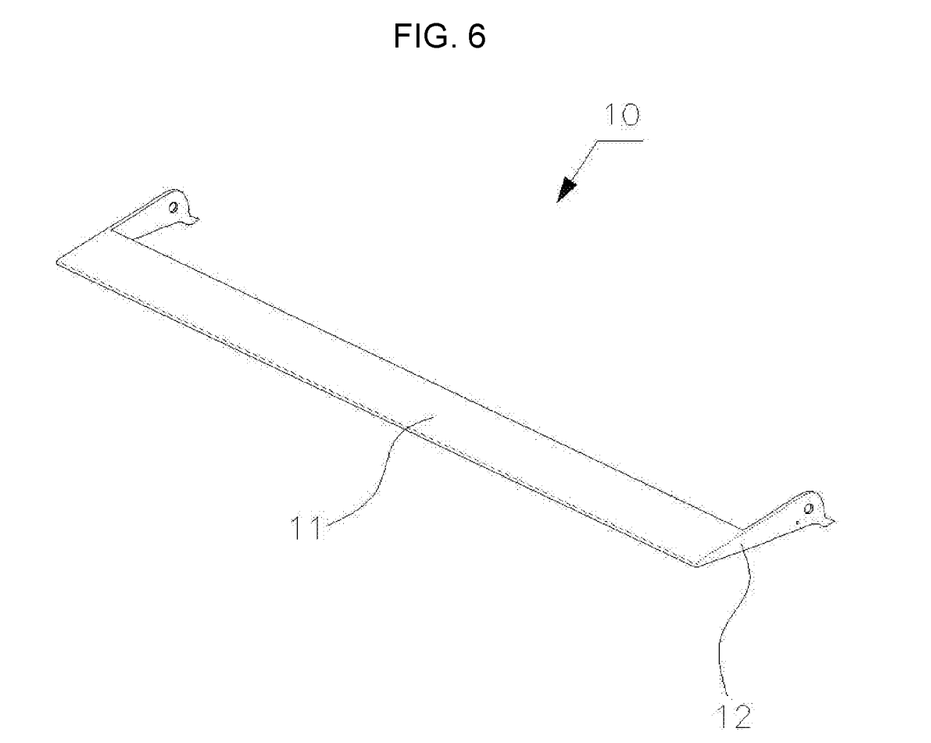
FIG. 6 is a perspective view illustrating an aero flap according to various embodiments of the present invention.
Figure 7:
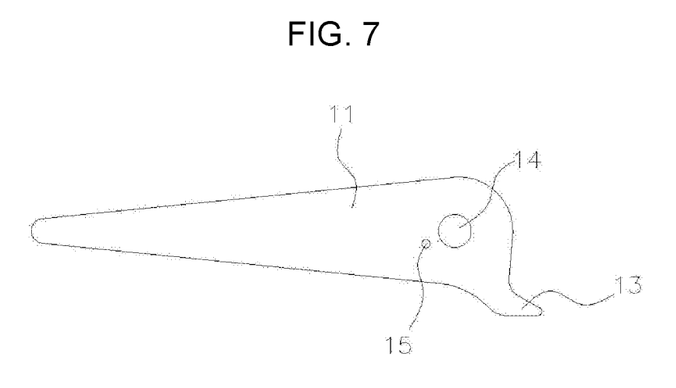
FIG. 7 illustrates a side of the aero flap according to various embodiments of the present invention.

FIG. 6 is a perspective view illustrating the aero flap according to various embodiments of the present invention. FIG. 7 illustrates a side of the aero flap according to various embodiments of the present invention.

As illustrated, the aero flap 10 includes a flap. In detail, the aero flap 10 includes a flap wing 11 for blocking vehicle-induced wind and a pair of flap supporters 12 formed at both ends of the flap wing 11 to fix and support the flap wing 11 to the muffler 100.

The flap wing 11 included in the aero flap 10 may be configured to have a bar shape, a wing shape, or a plane shape. The flap supporters 12 are configured as a pair extending from both ends of the flap wing 11. A shape of the aero flap 10 may be configured to correspond to any one of the known structures and shapes of flap within the scope of the inventive concept of various embodiments of the present invention.

According to various embodiments of the present invention, the flap wing 11 may have a width corresponding to a width of a gap between the muffler 100 and a rear bumper of the vehicle so as to block vehicle-induced wind introduced to the gap. Furthermore, the flap wing 11 may have a length corresponding to a width of the muffler 100, so as to be coupled to both ends of the muffler 100, in which the flap wing 11 is disposed at the side of the muffler, and so as to fully cover the gap between the muffler 100 and the rear bumper.

An end of each flap supporter 12 is bored to form a shaft insertion hole 14 for being coupled to a shaft 21 in an inserted manner and a spring insertion hole 15 for being coupled to a spring in an inserted manner.

Furthermore, flap protrusions 13 protruding from the ends of the flap supporters 12 are further formed to each have a certain length. Each flap protrusion 13 rotates each flap supporter 12 (here, rotating each flap supporter about the shaft insertion hole 14, which is a fixed point) when power is applied according to operation of the actuator modules 30, which will be explained later. Each flap protrusion 13 may be formed to protrude from a lower end (or an upper part) of each flap supporter 12 to rotate the flap supporters 12 when power of the actuator modules 30 is applied.

Figure 8:
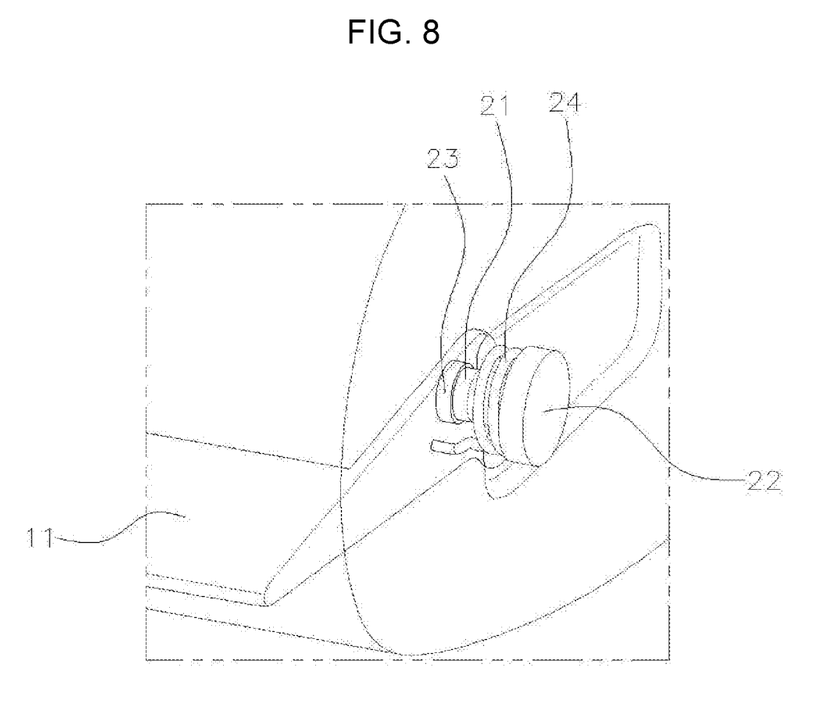
FIG. 8 is a perspective view illustrating a detailed coupling structure of each driveline according to various embodiments of the present invention.
Figure 9:
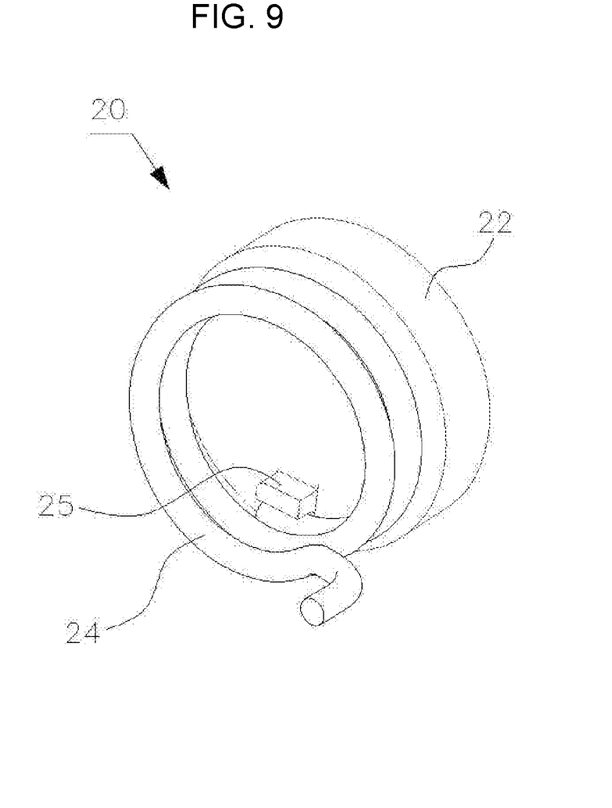
FIG. 9 is a perspective view illustrating an inner surface of each driveline according to various embodiments of the present invention.

FIG. 8 is a perspective view illustrating a detailed coupling structure of each driveline according to various embodiments of the present invention. FIG. 9 is a perspective view illustrating an inner surface of each driveline according to various embodiments of the present invention.

As illustrated, each driveline 20 includes a shaft 21 vertically coupled to the side of the muffler 100 so as to rotatably fix the flap supporter 12 of the aero flap 10, and a shaft head 22 formed at an end of the shaft 21 to prevent deviation of the aero flap 10. Furthermore, each driveline 20 further includes a bushing coupled to the shaft 21 to rotate the aero flap 10.

As illustrated, upon coupling of the aero flap 10, the shaft 21 of the driveline 20 is inserted into the shaft insertion hole 14 of the aero flap 10 to be coupled to the aero flap 10, and the bushing 23 is disposed on the shaft 21 to rotate the aero flap 10 coupled to the shaft 21.

Meanwhile, the aero flap 10 is rotated by applied power, namely, power generated by operation of the actuator modules 30. In this case, each driveline 20 further includes a spring 24 to provide restoring force to the aero flap 10 after interruption of power. According to various embodiments of the present invention, the spring 24 may include a coil spring but, it is understood that any kind of spring which provides restoring force by elastic force to the aero flap 10 may be employed.

As illustrated in FIGS. 8 and 9, one end of the spring 24 is coupled to the spring insertion hole 15 of the aero flap 10 in an inserted manner. The other end of the spring 24 is configured to fix the shaft head 22. To this end, a stopper 25 is further formed to fix the other end of the spring 24 to the shaft head 22. Thus, the spring 24 may be compressed when the aero flap 10 coupled to the shaft 21 is rotated by power applied to the driveline 20. Upon stoppage of power, the spring 24 may function to restore the aero flap 10 through elastic force.

Meanwhile, FIGS. 8 and 9 illustrate one driveline 20 for the sake of brevity, but it is understood that a pair of drivelines 20 is provided to correspond to a pair of flap supporters 12. The spring 24 may be applied to one of the drivelines 20 or both a pair of drivelines 20.

Figure 10:
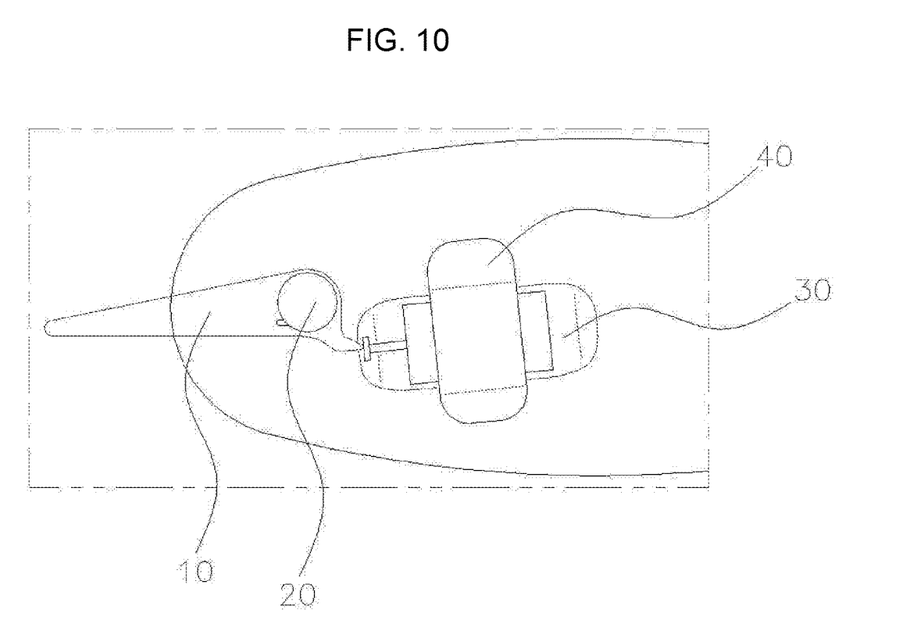
FIG. 10 is a sectional view illustrating each actuator module and each fixing bracket according to various embodiments of the present invention.

FIG. 10 is a sectional view illustrating each actuator module and each fixing bracket according to various embodiments of the present invention.

As illustrated, according to various embodiments of the present invention, each actuator module 30 includes an actuator 31 generating power for linear motion during operation, and an actuator linker 32 formed at an end of the actuator 31 to move using power generated by the actuator 31.

The actuator linker 32 protrudes from the actuator 31, and an end thereof extends to the flap protrusion 13 of the aero flap 10. Thus, the end of the actuator linker 32 is in contact with the flap protrusion 13. As a result, upon operation of each actuator module 30, power generated by the actuator 31 allows the actuator linker 32 to move, the end of the actuator linker 32 presses the flap protrusion 32, and, as such the aero flap 10 may be rotated.

Each fixing bracket 40 is a means for fixing each actuator module 30. According to various embodiments of the present invention, each actuator module 30 is configured to be fixed to each side of the muffler 100.

Furthermore, according to various embodiments of the present invention, in terms of a mounting structure, a curved actuator insertion groove 101, into which the actuator module 30 is inserted, may be formed at the muffler 100. A shape or size of the actuator insertion groove 101 may correspond to a shape and size of the actuator 31 included in the actuator module 30.

Figure 11:
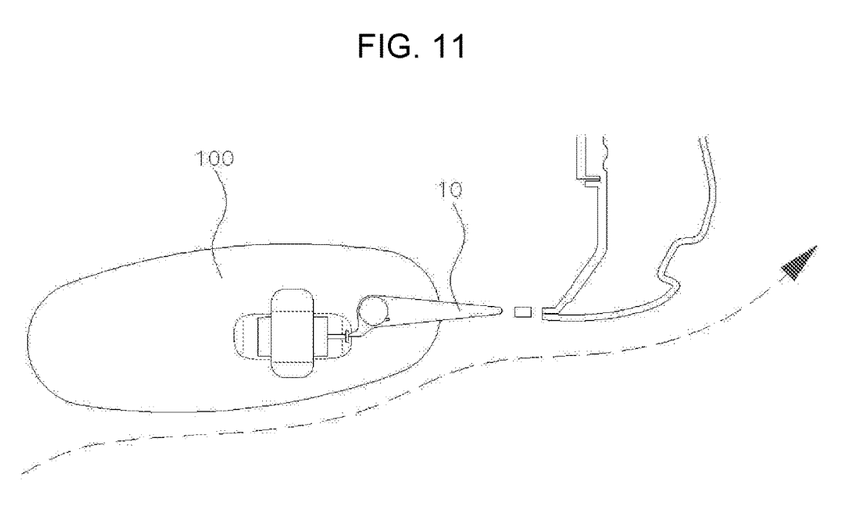
FIG. 11 illustrates a configuration of the vehicle including the active aero flap apparatus for the muffler during a section for prioritizing fuel efficiency of the vehicle according to various embodiments of the present invention.
Figure 12:
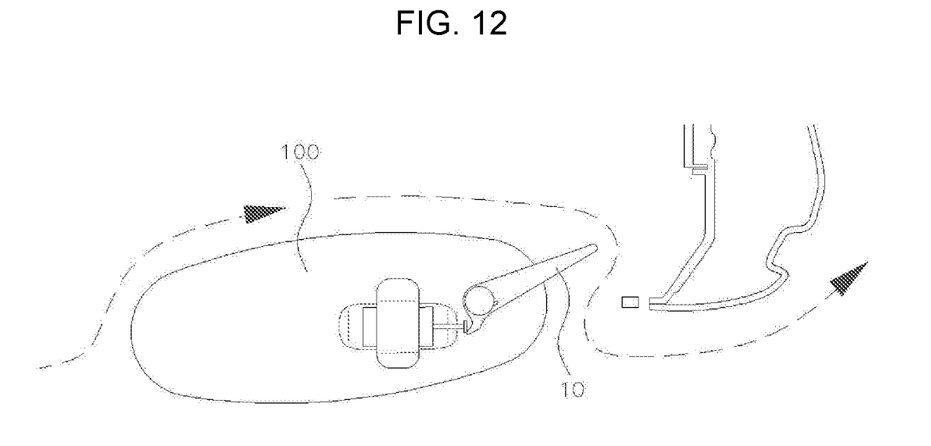
FIG. 12 illustrates a configuration of the vehicle including the active aero flap apparatus for the muffler during a section for preventing heat damage of the vehicle according to various embodiments of the present invention.
Figure 13:
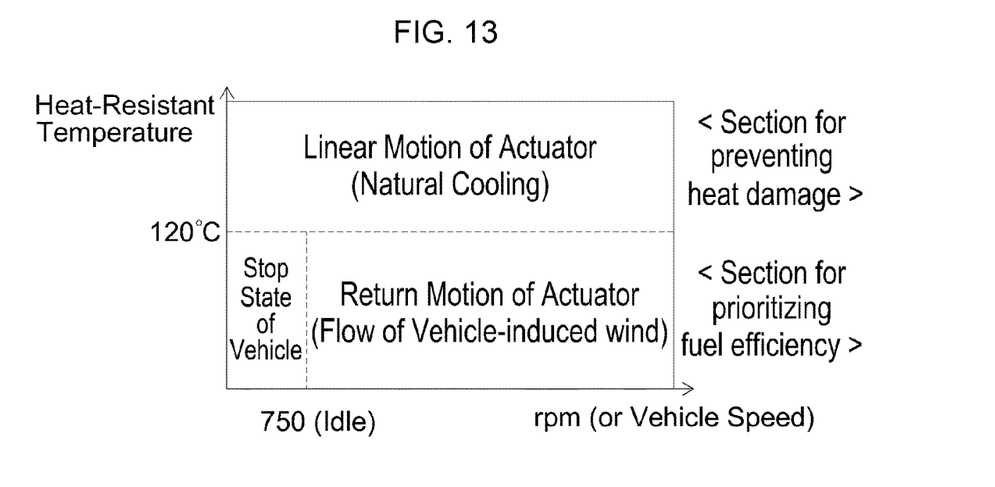
FIG. 13 is a graph illustrating the section for prioritizing fuel efficiency and the section for preventing heat damage according to various embodiments of the present invention.

FIG. 11 illustrates a configuration of the vehicle including the active aero flap apparatus for the muffler during a section for prioritizing fuel efficiency of the vehicle according to various embodiments of the present invention. FIG. 12 illustrates a configuration of the vehicle including the active aero flap apparatus for the muffler during a section for preventing heat damage of the vehicle according to various embodiments of the present invention. FIG. 13 is a graph illustrating the section for prioritizing fuel efficiency and the section for preventing heat damage according to various embodiments of the present invention.

As illustrated above, the aero flap 10 is configured to be rotated by power applied by operation of the actuator modules 30. In this case, a controller for controlling operation of the actuators 31 is provided. The controller may include a known microcontroller unit (MCU). Besides, the controller may include the known data processing unit capable of processing signals and information. Furthermore, the controller may include all sorts of control modules mounted at the vehicle, such as a module integrated into a body control module (BCM).

In various embodiments of the present invention, the controller receives vehicle information from the control modules (BCM, ECU, etc.) of the vehicle to determine whether the section for prioritizing fuel efficiency section or the section for preventing heat damage. As a result, the controller responds to this to control operation of actuators 30. In the controller, vehicle information, that is, factors for determining whether the section for prioritizing fuel efficiency section or the section for preventing heat damage, may include revolutions per minute (RPM), load, fuel efficiency, temperature, and so on. Such information may be obtained in connection with all sorts of premounted control modules in the vehicle.

As illustrated in FIG. 13, the section for prioritizing fuel efficiency has low levels of RPM, load, fuel efficiency, or temperature of the vehicle, so that the section for prioritizing fuel efficiency corresponds to a driving section without heat damage generated from the muffler 100. The section for preventing heat damage has high levels of RPM, load, fuel efficiency, or temperature of the vehicle, so that the section for preventing heat damage refers to a driving section with heat damage generated by the muffler 100.

In various embodiments of the present invention, the section for preventing heat damage may be set such that a temperature of a surrounding component (the rear bumper) is equal to or greater than a heat-resistant temperature (120° C.) or an RPM of the vehicle is less than an idle state (750 RPM) due to high speed/high load. Furthermore, the section for prioritizing fuel efficiency may be set such that the temperature of the surrounding component (the rear bumper) is less heat-resistant temperature (120° C.) or the RPM of the vehicle equal to or greater than an idle state (750 RPM) due to low speed/low load.

As a result, in the section for prioritizing fuel efficiency, since it is not necessary to cool the muffler 100 using vehicle-induced wind, the controller operates the actuator modules 30 to rotate the aero flap 10 so as to block the gap between the muffler 100 and the rear bumper using the flap wing 11. As a result, vehicle-induced wind may be not introduced to the gap between the muffler 100 and the rear bumper.

FIG. 11 illustrates a state of the aero flap blocking the gap between the muffler 100 and the rear bumper during the section for prioritizing fuel efficiency. In this case, it may show that vehicle-induced wind during driving is introduced between the muffler 100 and rear bumper, and is exhausted from a rear of the vehicle. In various embodiments of the present invention, rotation of the aero flap 10 in this process may be performed by restoring force of the spring 24 according to interruption of power due to linear return motion of the actuators 31.

On the other hand, in the section for preventing heat damage, it is necessary for the muffler 100 to be cooled by vehicle-induced wind to prevent heat damage due to the muffler 100. Thus, the controller restores the aero flap 10 to allow the flap wing 11 blocking the gap between the muffler 100 and the rear bumper to open the gap. As a result, the controller controls vehicle-induced wind to be introduced between the muffler 100 and the rear bumper during driving.

FIG. 12 illustrates the aero flapper 10 in a state opening the gap between the muffler 100 and the rear bumper in the section for preventing heat damage. It may show that vehicle-induced wind is introduced between the muffler 100 and the rear bumper to rapidly naturally cool the muffler 100. In various embodiments of the present invention, rotation of the aero flap 10 may be performed by power applied by linear motion of the actuators 30. In this case, since power is greater than elastic force of the spring 24, the aero flap 10 is rotated by overcoming elastic force of the spring 24. The spring 24 is compressed and prepares to provide restoring force in the section for prioritizing fuel efficiency.

As apparent from the above description, in accordance with various embodiments of the present invention, the aero flap apparatus is mounted at the side end of the muffler of the vehicle to actively block and unblock vehicle-induced wind introduced to the side end of the muffler according to a state of generation of heat damage. During the constant speed section having low temperature for prioritizing fuel efficiency, under covering is performed to block vehicle-induced wind. During the high speed section having high temperature for preventing heat damage, stoppage of under covering is performed for vehicle-induced wind to be introduced. Thus, heat damage of the exhaust system disposed at the lower part of the vehicle may be resolved and aerodynamics may be improved through the active aero flap apparatus having such a variable structure.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An active aero flap apparatus for a muffler of a vehicle comprising:
    an aero flap comprising a flap wing disposed at a side of the muffler, into which vehicle-induced wind is introduced, to block introduction of the vehicle-induced wind, and flap supporters formed to expand from each of two ends of the flap wing;
    drivelines rotatably coupling ends of the flap supporters to the muffler; and
    actuator modules including actuators and rotating the aero flap about the drivelines.

2. The active aero flap apparatus according to claim 1, wherein each of the drivelines comprises:
    a shaft fixing each corresponding flap supporter to the muffler;
    a shaft head formed at an end of the shaft; and
    a bushing rotating the corresponding flap supporter coupled to the shaft.

3. The active aero flap apparatus according to claim 1, wherein each of the drivelines comprises a spring, a first end of which is fixed at the corresponding flap supporter and a second end of which is fixed at the corresponding driveline, and
    the spring provides restoring force due to elastic force upon operation of the aero flap.

4. The active aero flap apparatus according to claim 3, wherein each of the flap supporters of the aero flap is bored to form a spring insertion hole, to which the first end of the spring is insertedly coupled, and
    each of the drivelines includes a stopper for fixing the second end of the spring.

5. The active aero flap apparatus according to claim 1, further comprising flap protrusions formed to protrude from ends of the flap supporters and to each have an assigned length,
    wherein the flap protrusions are pressed against by ends of the actuators to rotate the aero flap upon operation of the actuator modules.

6. The active aero flap apparatus according to claim 2, wherein each of the flap supporters is bored to form a shaft insertion hole for coupling of the shaft at an end thereof.

7. The active aero flap apparatus according to claim 1, further comprising a controller controlling operation of the actuator modules,
    wherein the controller receives vehicle information to determine one of a section for preventing heat damage or a section for prioritizing fuel efficiency,
    wherein in the section for preventing heat damage, the controller controls the actuator modules to rotate the flap wing and for vehicle-induced wind to be introduced to the muffler side, and wherein in the section for prioritizing fuel efficiency, the controller controls the actuator modules to block introduction of the vehicle-induced wind to the muffler side.

8. The active aero flap apparatus according to claim 1, wherein the muffler is formed to have curved actuator insertion grooves at sides thereof, into which the actuator modules are inserted.

9. The active aero flap apparatus according to claim 1, further comprising fixing brackets fixing the actuator modules to the muffler.

* * * * *